Dec. 12, 1933.                J. H. VICTOR ET AL                1,938,648
                                GREASE RETAINER
                              Filed Feb. 13, 1933
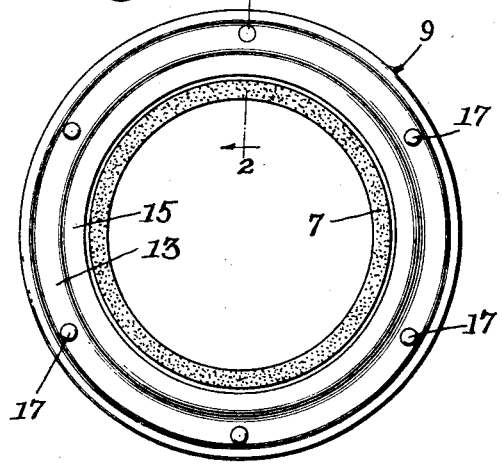
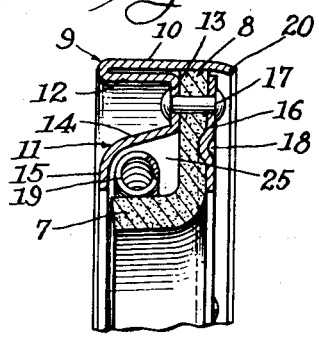
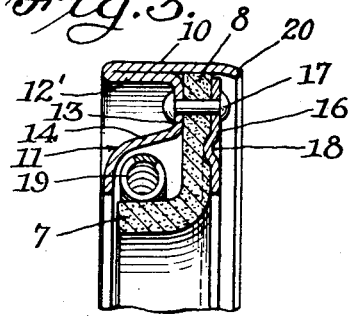
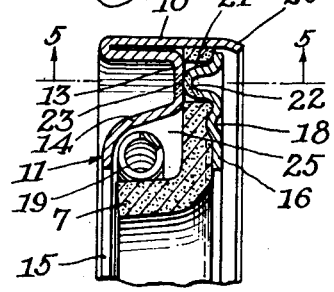
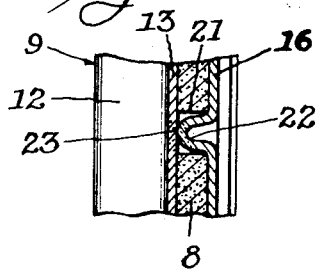
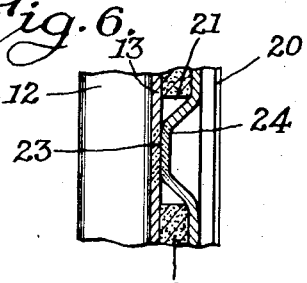
INVENTOR
John H. Victor and
BY William A. Heinze
Wm. D. Bell
ATTORNEY Patented Dec. 12, 1933

1,938,648

UNITED STATES PATENT OFFICE 1,938,648

GREASE RETAINER

John H. Victor, Evanston, and William A. Heinze, Chicago, Ill., assignors to Victor Manufacturing & Gasket Company, Chicago, Ill., a corporation of Illinois Application February 13, 1933. Serial No. 656,460

6 Claims. (Cl. 288—1)

This invention relates to grease retainers and its object is to provide a novel and simple device of compact size and unit construction which will effectively prevent the escape of grease or oil in any installation in which it may be used. A particular use of the invention is to form a seal about the rear axle of an automobile and it may be used in many other installations for a like purpose.

Another object of the invention is to provide a retainer of this kind having but few parts formed in a novel manner to securely hold a packing in position to provide a grease and oil seal.

In the accompanying drawing illustrating selected embodiments of the invention,

Fig. 1 is a side view of the retainer.

Fig. 2 is a sectional view on the line 2—2 of Fig. 1.

Fig. 3 is a view similar to Fig. 2 and showing a slightly different construction.

Fig. 4 is a view similar to Figs. 2 and 3 except that the parts are held together by welding instead of by rivets.

Fig. 5 is a sectional view on the line 5—5 of Fig. 4.

Fig. 6 is a view similar to Fig. 5 showing a modified form.

Referring to the drawing, the packing preferably comprises a ring made of leather or other suitable material having a tubular portion 7 to engage a shaft and a radial portion 8 which is securely held against rotation in a shell 9. The shell is formed from sheet metal and comprises a rim 10 having at one edge thereof an inwardly extending side 11 formed by folding the metal within the rim and upon itself at 12, then radially and inwardly of the rim at 13, then outwardly at 14, and then radially and inwardly at 15, Fig. 2. The inner fold 12 provides a reenforcement to strengthen and stiffen the rim and it may be slightly spaced from the rim as shown in Fig. 2 or it may be radially folded against the rim as shown at 12' in Fig. 3. The inner fold 12, the radial section 13 and the section 14 provide an annular recess or indenture in the side of the shell and the conformation of this side of the shell provides a substantial reenforcement for the shell. The radial portion 8 of the packing is axially clamped between the radial section 13 of the shell and a washer 16 by rivets 17, Figs. 1–3, which pass entirely through the radial section 13, the radial portion of the packing 8 and the washer 16. This washer constitutes in effect the other side of the shell and it may be provided with an annular indenture 18 which is embedded in the packing and assists in retaining the packing in fixed position. Any number of rivets 17 may be employed and they are spaced apart as desired. These rivets securely fasten the parts together so that the packing and washer are rigidly held with the shell against relative rotative movement. A resilient ring preferably in the form of a coil spring 19 is retained between the packing and the side of the shell and operates to hold the tubular portion of the packing in close contact with the shaft upon which the retainer is mounted. The edge 20 of the rim may be turned slightly inward to form a lead for the retainer according to common practice in the arts and facilitate the insertion of the retainer in a housing.

Instead of securing the parts together by rivets as shown in Figs. 1–3, we may provide the packing with openings 21 and the washer with indented studs 22 to extend through the openings and engage the radial section 13 of the shell to which the studs are secured by welding at 23. These studs 22 may be substantially round as shown in Figs. 4 and 5, or they may be elongated as shown at 24 in Fig. 6.

The invention provides a retainer of simple construction comprising but few parts which are securely and rigidly held together in a strong substantial unit adapted for immediate installation to prevent the escape of grease or oil. The shell is formed in a novel manner to enable the packing to be secured directly thereto for holding it in proper position in the shell and against relative rotative movement. The washer forms an anchorage for the rivets whereby the packing is held in place in the shell, or it provides the studs which are to be welded to the shell for the same purpose. The radial portion of the packing is radially held between the washer and the sides of the shell to form a seal and prevent the escape of grease or oil from the spring chamber 25 around the periphery of the packing. The annular indenture 18 compresses the packing between itself and the radial portion 13 of the side of the shell and enhances the sealing effect at the peripheral portion of the packing.

We do not limit the invention to the specific disclosure in the foregoing description and drawing but reserve the right to make any changes in the form, construction and arrangement of parts as may be necessary or desirable for the many purposes for which grease retainers are employed and within the scope of the following claims:

We claim:

1. A grease retainer comprising a packing ring having a tubular portion to receive a shaft and a radially extending portion, a shell comprising a rim surrounding the packing, said shell having an integral side at one edge of the rim and said side having an annular indenture engaging one side of the radial portion of the packing, a washer engaging the other side of the radial portion of the packing, and means securing the washer and packing to the indented part of the shell and preventing relative rotative movement of the packing in the shell.

2. A grease retainer comprising a packing ring having a tubular portion to receive a shaft and a radially extending portion, a shell comprising a rim surrounding the packing, said shell having an integral side at one edge of the rim and said side having an annular indenture engaging one side of the radial portion of the packing, a washer engaging the other side of the radial portion of the packing, means passing through the packing and securing the packing between the washer and the indented part of the shell, and preventing relative rotative movement of the packing in the shell.

3. A grease retainer comprising a packing ring having a tubular portion to receive a shaft and a radially extending portion having openings therein, a shell comprising a rim surrounding the packing, said shell having an integral side at one edge of the rim and said side having an annular indenture engaging one side of the radial portion of the packing, a washer engaging the other side of the radial portion of the packing, and studs on said washer extending through said openings in the packing and welded to the indented part of the shell to secure the packing in the shell.

4. A grease retainer comprising a packing ring having a tubular portion to receive a shaft and a radially extending portion, a washer engaging one side of the radial portion of the packing, a shell comprising a rim surrounding the packing and washer, a side on said rim integral with one edge thereof and folded inwardly adjacent the rim and bent radially and outwardly to form an annular indenture engaging the other side of the radial portion of the packing, and means securing the packing between the washer and the indented part of the shell and preventing rotative movement of the packing in the shell.

5. A grease retainer comprising a packing ring having a tubular portion to receive a shaft and a radially extending portion, a washer engaging one side of the radial portion of the packing, a shell comprising a rim surrounding the packing, a side on said rim integral with one edge thereof, said side being folded inwardly adjacent the inner side of the rim and bent radially and outwardly to form an annular indenture engaging the other side of the radial portion of the packing, means securing the radial portion of the packing between the washer and the indented part of the shell and preventing relative rotative movement of the packing and the shell, the inner marginal edge portion of the side extending radially and a resilient member retained between the packing and the indenture of the side of the shell and that part of the side of the shell extending inwardly from said indenture.

6. A grease retainer comprising a packing ring having a tubular portion to receive a shaft and a radially extending portion, a shell comprising a rim surrounding the packing, said shell having an integral side at one edge of the rim and said side having an annular indenture engaging one side of the radial portion of the packing, a washer engaging the other side of the radial portion of the packing, means securing the washer and packing to the indented part of the shell, and an annular indenture in the washer compressing the packing between itself and the indented part of the shell.

JOHN H. VICTOR.
WILLIAM A. HEINZE.